(12) United States Patent
Tanikawa (10) Patent No.: US 8,559,110 B2
(45) Date of Patent: Oct. 15, 2013

(54) OPTICAL DEVICE

(75) Inventor: Yohei Tanikawa, Hino (JP)

(73) Assignee: Olympus Corporation, Tokyo (JP)

(*) Notice: Subject to any disclaimer, the term of this patent is extended or adjusted under 35 U.S.C. 154(b) by 219 days.

(21) Appl. No.: 13/175,213

(22) Filed: Jul. 1, 2011

(65) Prior Publication Data

US 2012/0002287 A1    Jan. 5, 2012

(30) Foreign Application Priority Data

Jul. 2, 2010    (JP) .................................. 2010-152208

(51) Int. Cl.
G02B 5/18    (2006.01)

(52) U.S. Cl.
USPC .............. 359/576; 359/569; 359/575; 428/38

(58) Field of Classification Search
USPC ......... 369/584, 586, 587, 588, 589, 590, 575, 369/576; 428/38

See application file for complete search history.

(56) References Cited

U.S. PATENT DOCUMENTS

| | | | | |
|---|---|---|---|---|
| 5,407,738 A * | 4/1995 | Tabata et al. | ..................... | 428/38 |
| 7,508,585 B2 * | 3/2009 | Maeno | .......................... | 359/575 |
| 7,729,053 B2 * | 6/2010 | Okano | .......................... | 359/575 |

FOREIGN PATENT DOCUMENTS

| | | |
|---|---|---|
| JP | 64-072102 | 3/1989 |
| JP | 2003-098312 | 4/2003 |

* cited by examiner

Primary Examiner — Audrey Y Chang
(74) Attorney, Agent, or Firm — Kenyon & Kenyon LLP (57) ABSTRACT

Provided is an optical device that includes a substrate, a plurality of pillars arrayed on the surface of the substrate at intervals of a pitch that is equal to or less than the wavelength of incident light, and a medium that fills the gaps between the pillars and that has a different refractive index from the pillars. Each of the pillars has one or more steps that discontinuously change the transverse cross-sectional area of the pillar, along the direction perpendicular to the surface of the substrate. The transverse cross-sectional area of at least one of step portions formed by the steps of the pillar differs from the transverse cross-sectional area of an adjacent pillar.

8 Claims, 10 Drawing Sheets

| LAYER | MATERIAL | WIDTH nm | THICKNESS nm |
|---|---|---|---|
| SIXTH LAYER | MATERIAL HAVING A REFRACTIVE INDEX OF 2.2 | 32 | 91 |
| FIFTH LAYER | MATERIAL HAVING A REFRACTIVE INDEX OF 2.2 | 126 | 131 |
| FOURTH LAYER | MATERIAL HAVING A REFRACTIVE INDEX OF 2.2 | 32 | 37 |
| THIRD LAYER | MATERIAL HAVING A REFRACTIVE INDEX OF 2.2 | 126 | 18 |
| SECOND LAYER | MATERIAL HAVING A REFRACTIVE INDEX OF 2.2 | 38 | 55 |
| FIRST LAYER | MATERIAL HAVING A REFRACTIVE INDEX OF 2.2 | 60 | 2000 |
| SUBSTRATE | S-BAL11 | — | — |

| LAYER | MATERIAL | WIDTH nm | THICKNESS nm |
|---|---|---|---|
| SIXTH LAYER | MATERIAL HAVING A REFRACTIVE INDEX OF 2.2 | 103 | 77 |
| FIFTH LAYER | MATERIAL HAVING A REFRACTIVE INDEX OF 2.2 | 38 | 103 |
| FOURTH LAYER | MATERIAL HAVING A REFRACTIVE INDEX OF 2.2 | 103 | 77 |
| THIRD LAYER | MATERIAL HAVING A REFRACTIVE INDEX OF 2.2 | 38 | 103 |
| SECOND LAYER | MATERIAL HAVING A REFRACTIVE INDEX OF 2.2 | 78 | 28 |
| FIRST LAYER | MATERIAL HAVING A REFRACTIVE INDEX OF 2.2 | 60 | 2000 |
| SUBSTRATE | S-BAL11 | — | — |

FIG. 16

OPTICAL DEVICE

CROSS REFERENCE TO RELATED APPLICATIONS

This application claims benefit of Japanese Application No. 2010-152208 filed in Japan on Jul. 2, 2010, the contents of which is hereby incorporated by its reference.

BACKGROUND OF THE INVENTION

1. Field of the Invention

The present invention relates to an optical device.

2. Description of Related Art

A half-mirror that can adjust the reflectance by using dielectric multilayer films is conventionally known (for example, see Japanese Unexamined Patent Application, Publication No. Sho-64-72102). Further, a anti-reflection technology by using multilayer films is also known (for example, see Japanese Unexamined Patent Application, Publication No. 2003-98312).

In these cases, the reflectance is accurately controlled with multilayer films by adjusting the thickness and the refractive index of each layer of the multilayer films.

However, in the case of the multilayer films described in Japanese Unexamined Patent Application, Publication No. Sho-64-72102 and Japanese Unexamined Patent Application, Publication No. 2003-98312, it is difficult to change the thickness and the refractive index of each layer of the multilayer films toward an in-plane direction that is perpendicular to the thickness direction in each layer. As a result, it is difficult to configure an optical device in which refractive power is accurately controlled with multilayer films.

BRIEF SUMMARY OF THE INVENTION

The present invention has been made in view of the above-described circumstances and provides an optical device capable of accurately controlling the in-plane refractive index while accurately controlling the reflectance of incident light.

According to the present invention, there is provided an optical device including: a substrate; a plurality of pillars arrayed on a surface of the substrate at intervals of a pitch that is equal to or less than the wavelength of incident light; and a medium that fills gaps between the pillars and that has a different refractive index from the pillars, in which each of the pillars has one or more steps that discontinuously change the transverse cross-sectional area of the pillar along the direction perpendicular to the surface of the substrate; and the transverse cross-sectional area of at least one of step portions formed by the steps of the pillar differs from the transverse cross-sectional area of an adjacent pillar.

According to the present invention, a subwavelength structure is configured by a plurality of pillars arrayed on the surface of the substrate and the medium filling gaps between the pillars, and incident light can be transmitted without diffraction. In each of the pillars, a plurality of step portions are formed by steps that discontinuously change the transverse cross-sectional area of the pillar. Each of the step portions functions in the same way as a layer having an effective refractive index determined by the volume ratio of the pillar and the medium around the pillar, and, as a result, each pillar having the steps is equivalent to a multilayer film.

Then, when the transverse cross-sectional areas of adjacent pillars are made different at respective step portions, the effective refractive index can be changed in a direction along the surface of the substrate, and, as a result, the optical device has refractive power.

Specifically, in the subwavelength structure formed by the plurality of pillars each having the steps, the transverse cross-sectional areas at respective step portions are adjusted to change the effective refractive index in the in-plane direction to give refractive power, and the position of each step and the thickness dimension of each step portion are adjusted to form a structure equivalent to a multilayer film and to accurately control the reflectance of incident light.

In the above-described invention, one or more step portions having thicknesses equal to or less than the wavelength of the incident light may be provided on the tip surface of each of the pillars.

By doing so, one or more layers that cause the interference effect can be formed by the step portions formed on the tip surface of each of the pillars.

Furthermore, in the above-described invention, the step portions having thicknesses equal to or less than the wavelength of the incident light may have an antireflection function due to an interference effect.

Furthermore, in the above-described invention, the step portions having thicknesses equal to or less than the wavelength of the incident light may have a reflection increasing function due to an interference effect.

Furthermore, in the above-described invention, the medium may be air.

By doing so, the effective refractive index can be easily set by the volume ratio of the pillars and the air that is in the gaps between the pillars.

Furthermore, in the above-described invention, the medium may be made of a solid material.

By doing so, it is possible to prevent dust etc. from entering the gaps between the pillars because the gaps between the pillars are filled with the solid material.

Furthermore, in the above-described invention, the effective refractive indices determined by the volume ratios of the pillars and the medium in unit pitches that are formed by the pillars and the gaps between the pillars may have the largest value at the center of the optical device and may be gradually reduced toward the peripheries of the optical device.

By doing so, an optical device having positive refractive power can be easily configured.

Furthermore, in the above-described invention, the effective refractive indices determined by the volume ratios of the pillars and the medium in unit pitches that are formed by the pillars and the gaps between the pillars may have the smallest value at the center of the optical device and may be gradually increased toward the peripheries of the optical device'.

By doing so, an optical device having negative refractive power can be easily configured.

According to the present invention, an advantage is afforded in that the refractive index in the in-plane direction can be accurately controlled while accurately controlling the reflectance of incident light.

DETAILED DESCRIPTION OF THE INVENTION

An optical device 1 according to an embodiment of the present invention will be described below with reference to the drawings.

Figure 1:
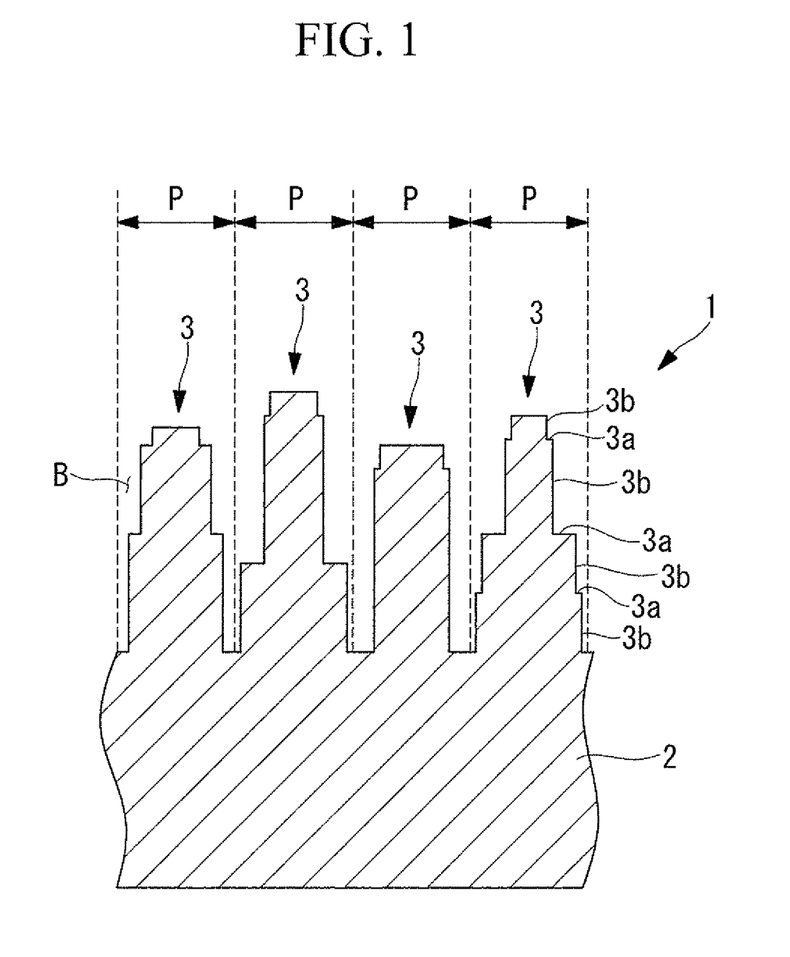
FIG. 1 is a partial longitudinal cross-sectional view showing an optical device according to an embodiment of the present invention.

As shown in FIG. 1, the optical device 1 of this embodiment includes a substrate 2 made of a transparent material and a plurality of pillars 3 arrayed on one surface of the substrate 2.

As shown in FIG. 1, each of the pillars 3 has a plurality of steps 3a at intervals in the direction perpendicular to the surface of the substrate 2. Each of the transverse cross-sectional areas of a plurality of step portions 3b that are formed by the steps 3a is substantially constant, and the transverse cross-sectional areas are changed discontinuously at the positions of the steps 3a.

The pillars 3 are arrayed at intervals of a constant pitch P that is equal to or less than the wavelength of incident light.

Since the pillars 3 are arrayed at intervals of the pitch P, which is equal to or less than the wavelength of incident light, a subwavelength structure is configured.

Figure 2:
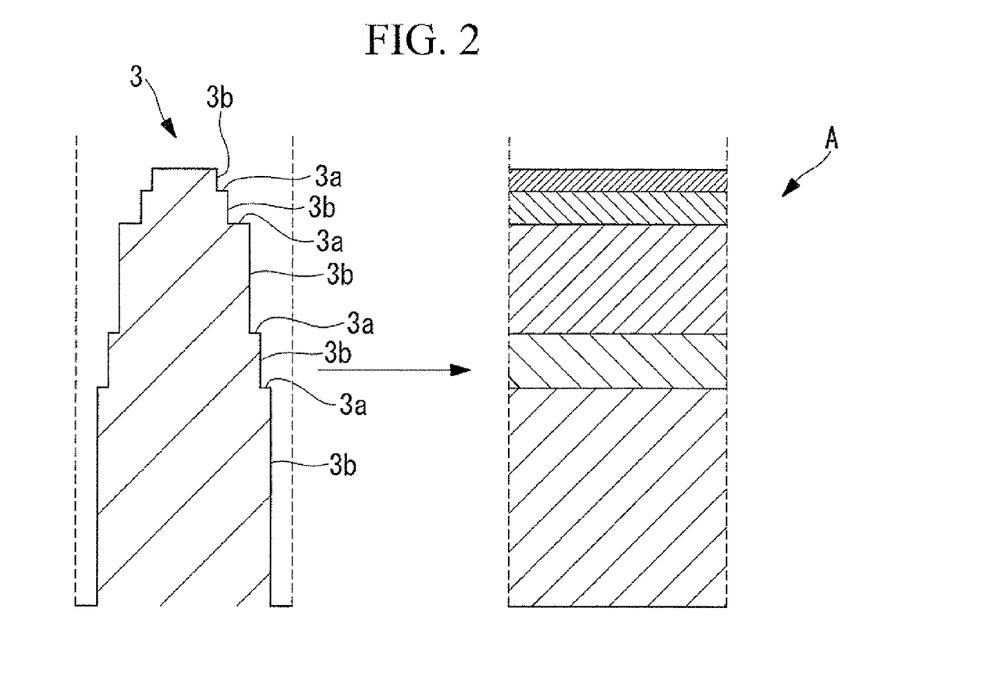
FIG. 2 is a partial longitudinal cross-sectional view showing a pillar of the optical device shown in FIG. 1 and a multilayer film equivalent to the pillar.
Figure 3:
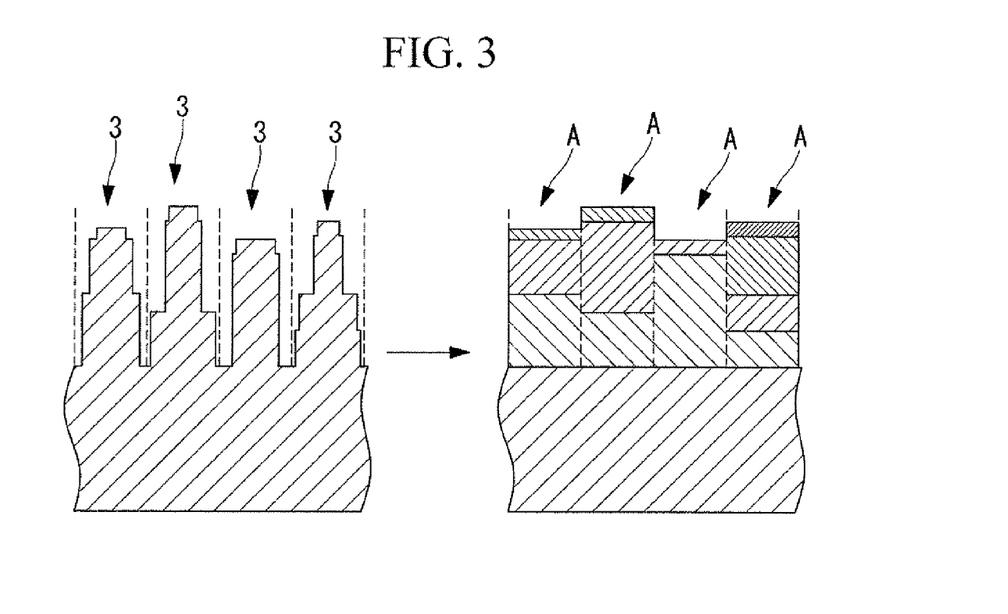
FIG. 3 is a partial longitudinal cross-sectional view showing the optical device shown in FIG. 1 and multilayer films equivalent to the optical device.

As shown in FIGS. 2 and 3, since each of the pillars 3 has one or more steps 3a, the pillar 3 is regarded as a structure equivalent to a multilayer film A.

When the transverse cross-sectional areas are made different in the step portions 3b corresponding to the respective layers of the multilayer film A, the effective refractive indices are different in the unit periodic spaces repeated by the pitch P.

The effective refractive index can be calculated using Expression 1.

$$n_{TE} = \sqrt{fn_1^2 + (1-f)n_2^2}$$

$$n_{TE} = \sqrt{\frac{n_1^2 n_2^2}{fn_2^2 + (1-f)n_1^2}}$$

$$\text{where } f = \frac{w}{p}$$

Expression 1

Here, $n_{TE}$ indicates the effective refractive index for TE polarized light, $n_{TM}$ indicates the effective refractive index for TM polarized light, $n_1$ indicates the refractive index of each of the step portions 3b of the pillar 3, $n_2$ indicates the refractive index of a medium that exists around the step portion 3b, such as air B, and w indicates the width dimension of each step portion 3b.

Figure 6:
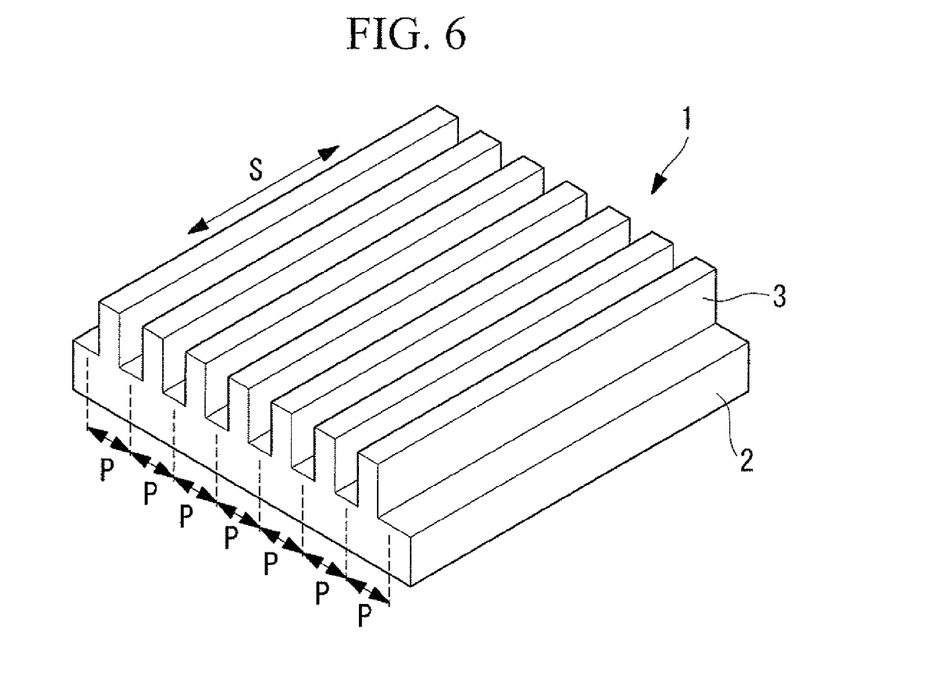
FIG. 6 is a perspective view showing a model optical device used for a calculation example of the reflectance-wavelength characteristic in the optical device shown in FIG. 1.

Furthermore, the TE polarization indicates that the electric field component of light oscillates in a direction parallel to a stripe structure (in the direction of an arrow S in FIG. 6), and the TM polarization indicates that the electric field component of light oscillates in a direction perpendicular to the stripe structure (in a direction perpendicular to the arrow S in FIG. 6).

According to the thus-configured optical device 1 of this embodiment, as shown in FIG. 3, it is possible to configure structures that are equivalent to different multilayer films A, in each pillar 3. As a result, an advantage is afforded in that the light reflectance can be accurately controlled with the multilayer films A, and the optical device 1 has refractive power by arraying the different multilayer films A along the surface of the substrate.

Although it is difficult to realize these structures with the multilayer films A, the structures can be easily configured in the optical device 1 of this embodiment.

Figure 4:
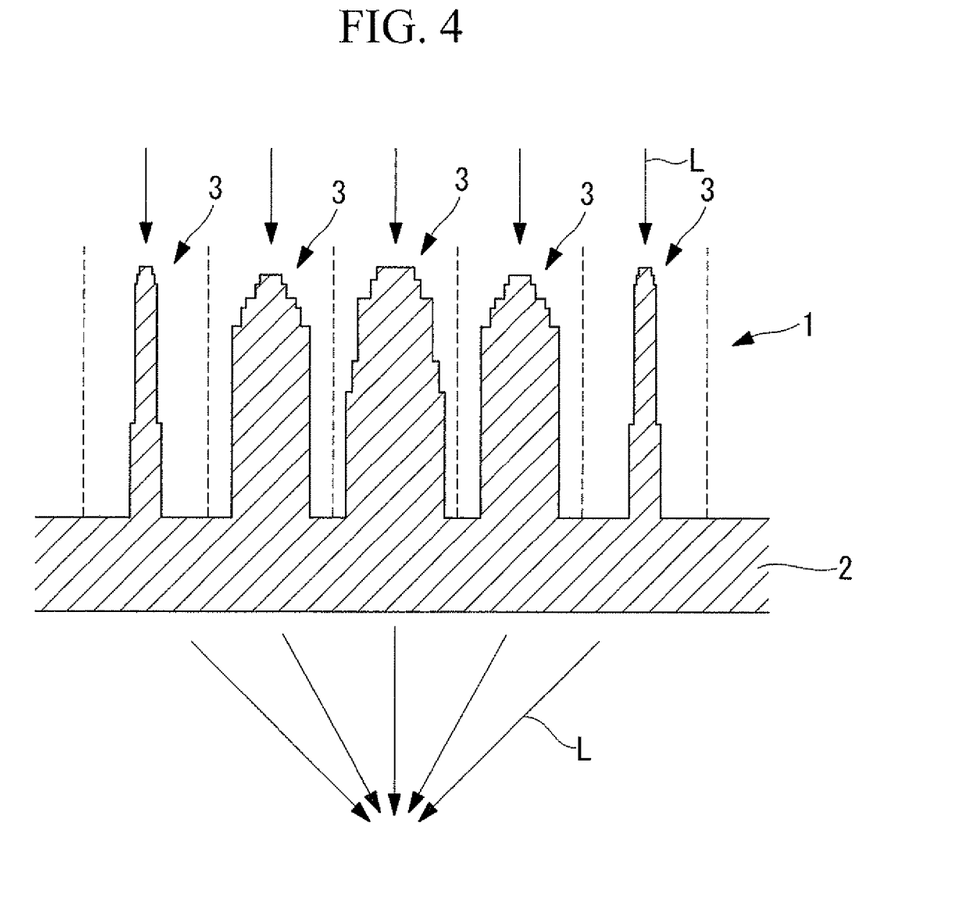
FIG. 4 is a partial longitudinal cross-sectional view showing an optical device having positive refractive power, as an example of the optical device shown in FIG. 1.

For example, as shown in FIG. 4, when the pillars 3 are configured such that the effective refractive indices of the pillars 3 have the largest value at the center of the optical device 1 and are gradually reduced toward the peripheries thereof, the optical device 1 can have positive refractive power for converging light L, as shown by arrows, as in a convex lens.

Figure 5:
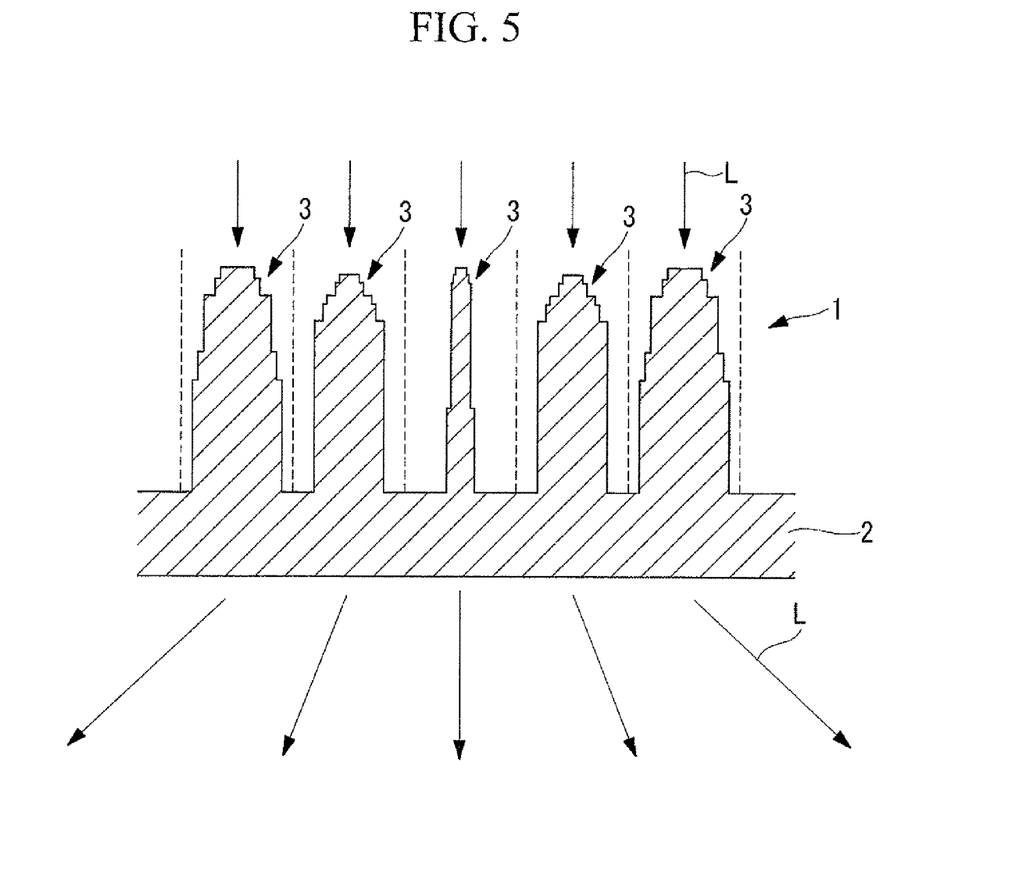
FIG. 5 is a partial longitudinal cross-sectional view showing an optical device having negative refractive power, as an example of the optical device shown in FIG. 1.

Furthermore, for example, as shown in FIG. 5, when the pillars 3 are configured such that the effective refractive indices of the pillars 3 have the smallest value at the center of the optical device 1 and are gradually increased toward the peripheries thereof, the optical device 1 can have negative refractive power for diverging the light L, as shown by arrows, as in a concave lens.

Note that, in the optical device 1 of this embodiment, the thickness dimension of a step portion 3b that is located at the tip of each pillar 3 may be set to the wavelength of the incident light L or less, thereby making the step portion 3b function as an antireflection layer or a reflection increasing layer due to interference effects.

The antireflection layer or the reflection increasing layer may be configured by a single step portion 3b or may be configured by a plurality of step portions 3b.

Furthermore, the thickness dimensions of all step portions 3b may be set to 1 μm or less. With this structure, reflectance control and refractive power control can be executed even for broadband light, such as natural light.

Furthermore, the thicknesses of all step portions 3b may be set to 100 nm or less. In designing the multilayer film for visible light, it is known that setting the thickness of each layer to 100 nm or less is effective. By doing so, the same effect as that of a multilayer film can be obtained.

Furthermore, in the optical device 1 of this embodiment, a description has been given of a case where the pillars 3 are arrayed at intervals of the constant pitch P; however, the arrangement is not limited thereto, and the pitch P may be changed along the surface direction as long as the pitch P is equal to or less than the wavelength of incident light and the volume ratio of the pillars 3 and gaps between the pillars is changed.

Furthermore, a description has been given of a case where air is provided, as a medium B, in the gaps between the pillars 3; however, the medium B is not limited thereto, and another medium B that has a refractive index different from that of a substance constituting the pillars 3 may fill the gaps. The medium B is not limited to gases, such as air, and a solid medium B may fill the gaps. In this case, there is an advantage in that dust etc. does not enter the gaps because the gaps are filled with the medium B.

Calculation examples of the reflectance of the optical device 1 of this embodiment are shown below.

A description will be given of a case where light having a polarization plane indicated by the arrow S is made to enter a stripe-type subwavelength structure in which the pillars 3 are arrayed in one dimensional direction at intervals of the constant pitch P, as shown in FIG. 6.

Figure 7:
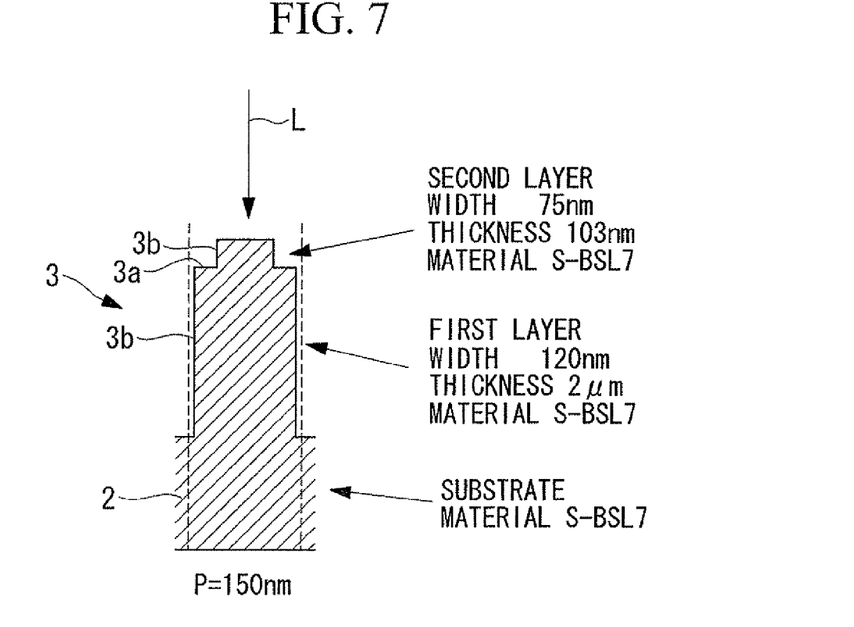
FIG. 7 is a longitudinal cross-sectional view showing the structure of a pillar in a first calculation example.
Figure 8:
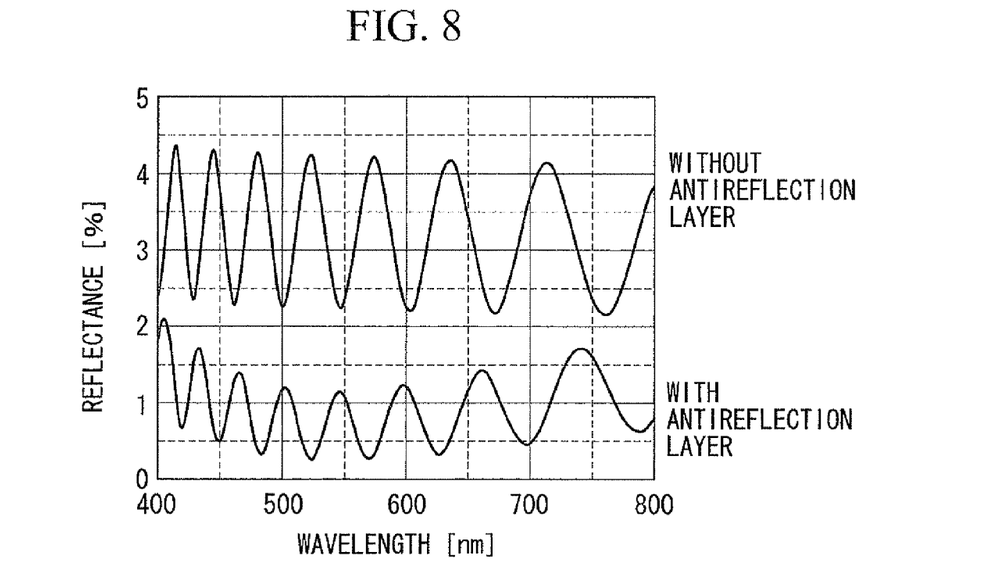
FIG. 8 is a graph showing the calculation example of the reflectance-wavelength characteristic in the pillar shown in FIG. 7.

FIG. 7 shows a pillar 3 in which an antireflection layer formed of a single step portion 3b is provided on the tip surface. Specifically, the pillar 3 is constituted by a first layer and a second layer provided on the substrate 2, and the second layer serves as an antireflection layer. FIG. 8 shows the reflectance-wavelength characteristic obtained with and without the antireflection layer when light is made to enter the pillar 3 from the direction perpendicular to the tip surface of the pillar 3. According to FIG. 8, it is clear that the reflectance is sufficiently reduced by the antireflection layer.

Figure 9:
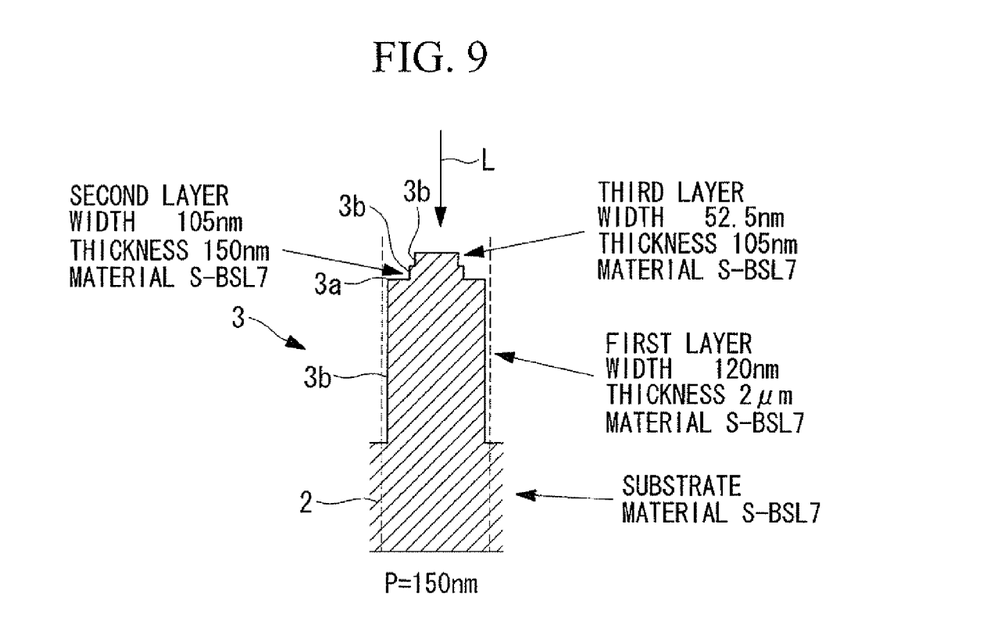
FIG. 9 is a longitudinal cross-sectional view showing the structure of a pillar used in a second calculation example.
Figure 10:
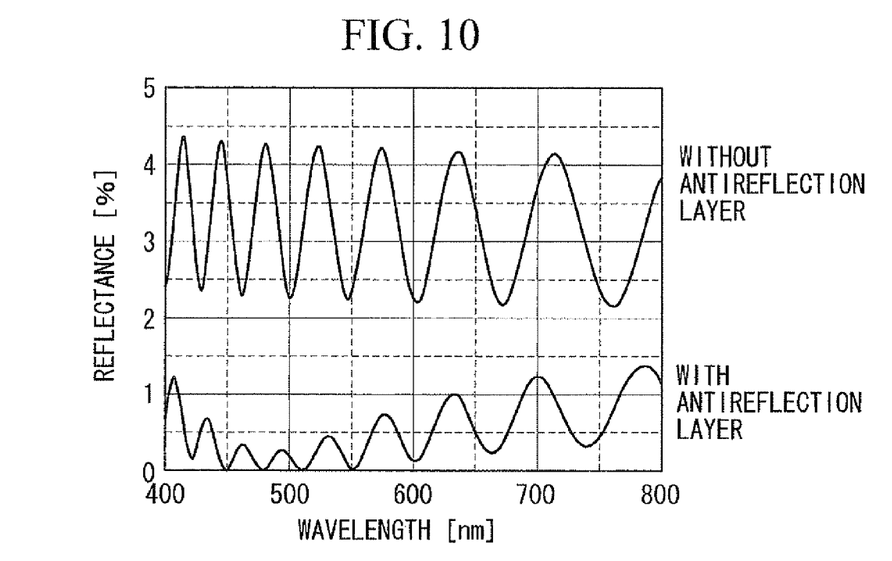
FIG. 10 is a graph showing the calculation example of the reflectance-wavelength characteristic in the pillar shown in FIG. 9.

FIG. 9 shows a pillar 3 in which antireflection layers formed of two step portions 3b are provided on the tip surface. Specifically, the pillar 3 is constituted by a first layer to a third layer provided on the substrate 2, and the second layer and the third layer serve as two antireflection layers. FIG. 10 shows the reflectance-wavelength characteristic obtained with and without the antireflection layers when light is made to enter the pillar 3 from the direction perpendicular to the tip surface of the pillar 3. According to FIG. 10, it is clear that the reflectance is sufficiently reduced by the antireflection layers.

Figure 11:
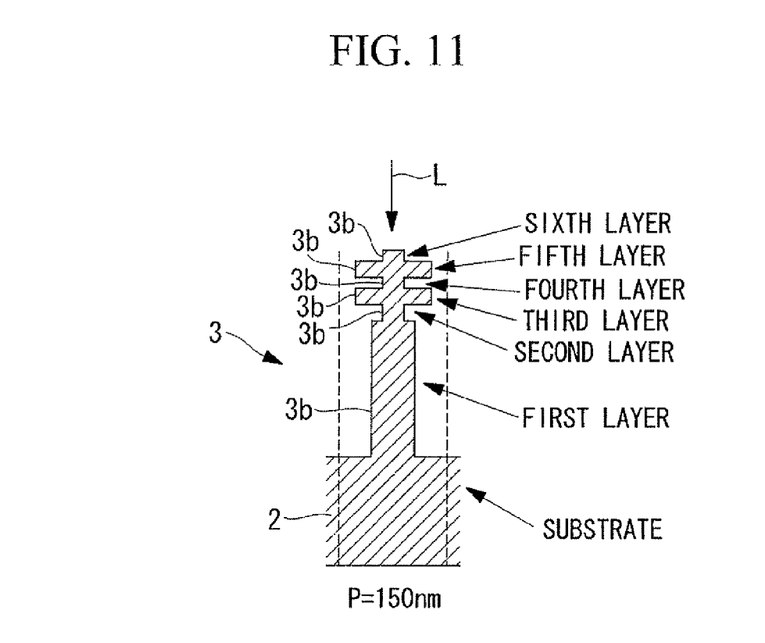
FIG. 11 is a longitudinal cross-sectional view showing the structure of a pillar used in a third calculation example.
Figure 12:
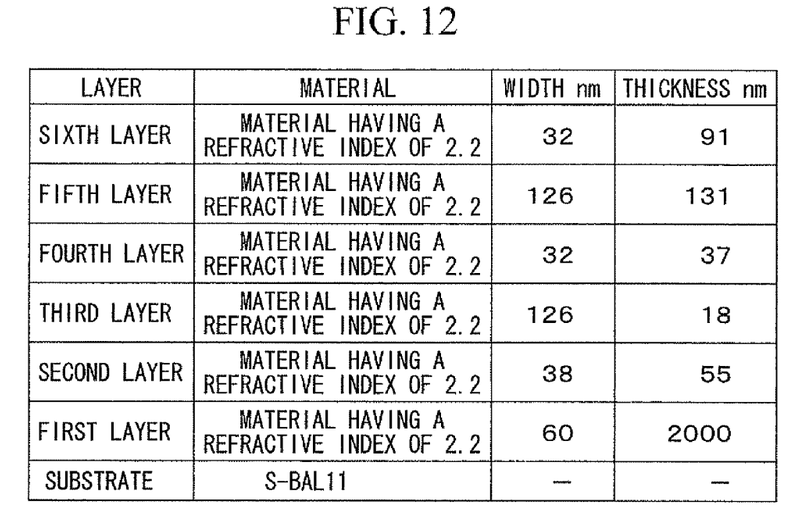
FIG. 12 is a diagram showing various values of respective layers of the pillar shown in FIG. 11.
Figure 13:
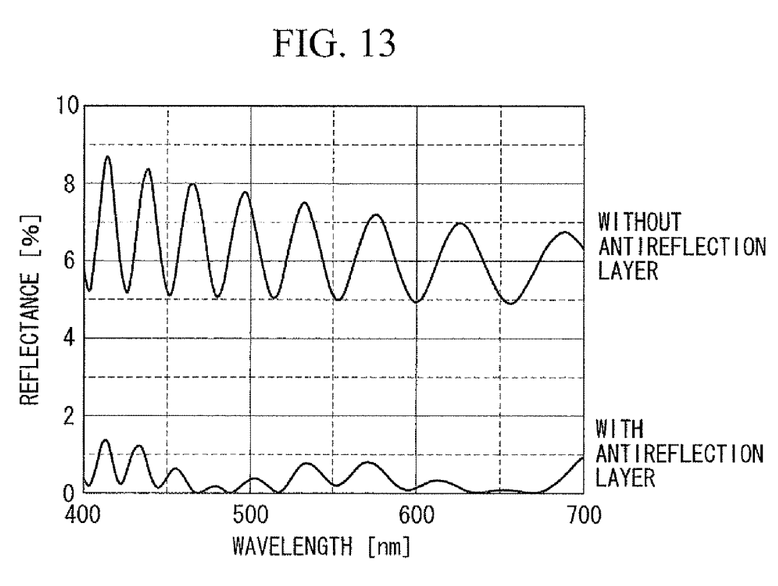
FIG. 13 is a graph showing the calculation example of the reflectance-wavelength characteristic in the pillar shown in FIG. 11.

FIG. 11 shows a pillar 3 in which antireflection layers formed of five step portions 3b are provided on the tip surface. Specifically, the pillar 3 is constituted by a first layer to a sixth layer provided on the substrate 2, and the second layer to the sixth layer serve as multiple antireflection layers. FIG. 12 shows various values of each layer, and FIG. 13 shows the reflectance-wavelength characteristic obtained with and without the antireflection layers when light is made to enter the pillar 3 from the direction perpendicular to the tip surface of the pillar 3. According to FIG. 13, it is clear that the reflectance is sufficiently reduced by the antireflection layers.

Figure 14:
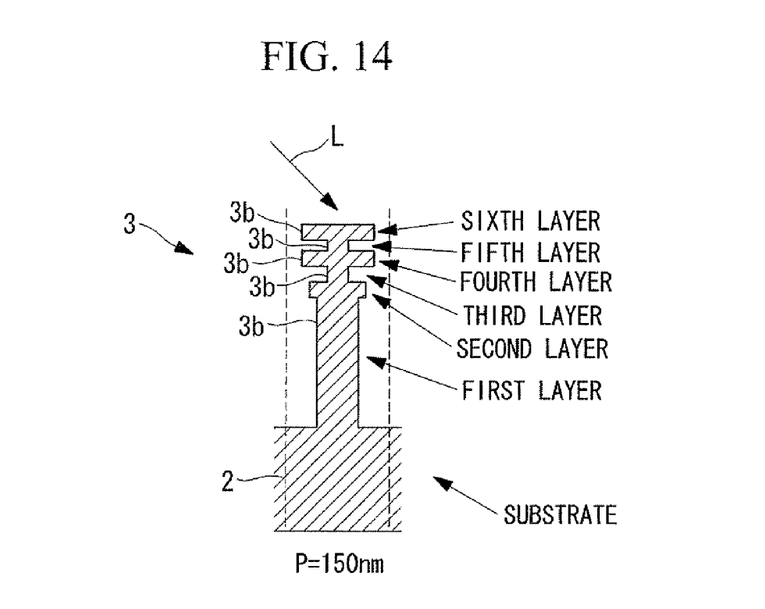
FIG. 14 is a longitudinal cross-sectional view showing the structure of a pillar used in a fourth calculation example.
Figure 15:
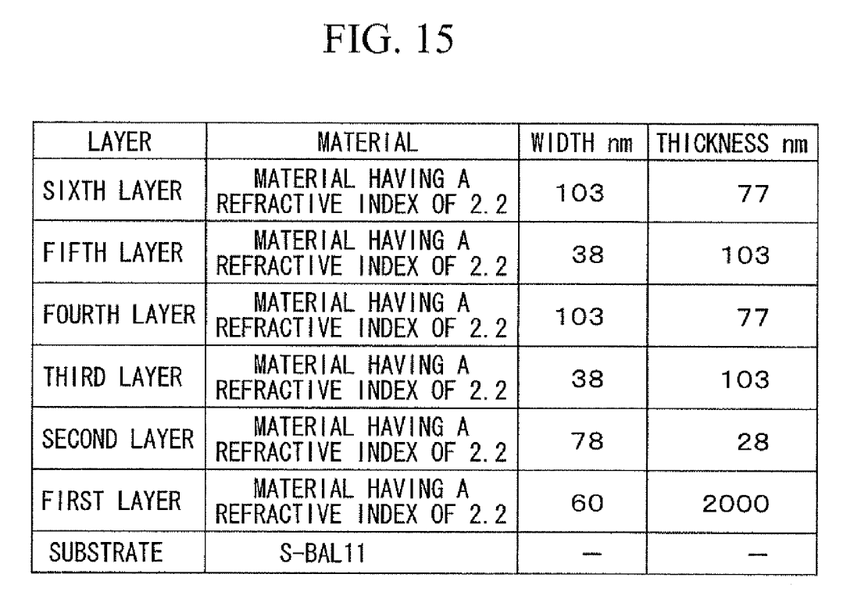
FIG. 15 is a diagram showing various values of respective layers of the pillar shown in FIG. 14.
Figure 16:
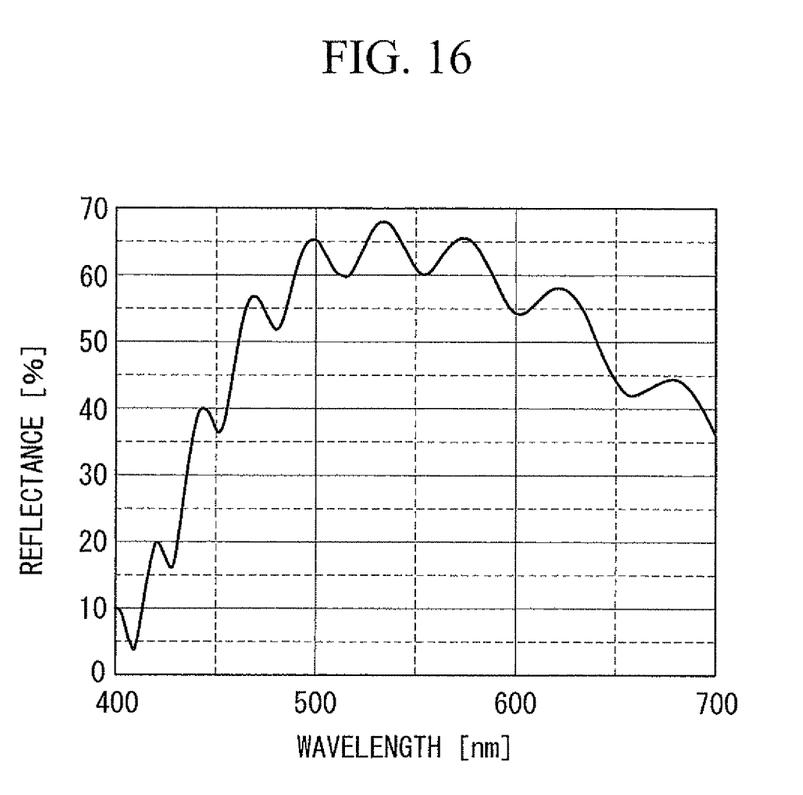
FIG. 16 is a graph showing the calculation example of the reflectance-wavelength characteristic in the pillar shown in FIG. 14.

FIG. 14 shows a pillar 3 in which reflection increasing layers formed of five step portions 3b are provided on the tip surface. Specifically, the pillar 3 is constituted by a first layer to a sixth layer provided on the substrate 2, and the second layer to the sixth layer serve as multiple reflection increasing layers. FIG. 15 shows various values of each layer, and FIG. 16 shows the reflectance-wavelength characteristic when light is made to enter the pillar 3 from a direction inclined by 45° with respect to the tip surface of the pillar 3. According to FIG. 16, it is clear that the reflectance is sufficiently increased by the reflection increasing layers.

What is claimed is:

1. An optical device comprising:
    a substrate;
    a plurality of pillars arrayed on a surface of the substrate at intervals of a pitch that is equal to or less than the wavelength of incident light; and
    a medium that fills gaps between the pillars and that has a different refractive index from the pillars,
    wherein each of the pillars has one or more steps that discontinuously change a transverse cross-sectional area of the pillar, along the direction perpendicular to the surface of the substrate; and
    wherein the transverse cross-sectional area on a plane, which is parallel to the surface of the substrate, of at least one of step portions formed by the steps of the pillar differs from the transverse cross-sectional area on the plane of another pillar which is adjacent to the pillar.

2. The optical device according to claim 1, wherein one or more step portions having thicknesses equal to or less than the wavelength of the incident light are provided on a tip surface of each of the pillars.

3. The optical device according to claim 2, wherein the step portions having thicknesses equal to or less than the wavelength of the incident light have an antireflection function due to an interference effect.

4. The optical device according to claim 2, wherein the step portions having thicknesses equal to or less than the wavelength of the incident light have a reflection increasing function due to an interference effect.

5. The optical device according to claim 1, wherein the medium is air.

6. The optical device according to claim 1, wherein the medium is made of a solid material.

7. The optical device according to claim 1, wherein effective refractive indices determined by volume ratios of the pillars and the medium in unit pitches that are formed by the pillars and the gaps between the pillars have a largest value at a center of the optical device and are gradually reduced toward peripheries of the optical device.

8. The optical device according to claim 1, wherein effective refractive indices determined by volume ratios of the pillars and the medium in unit pitches that are formed by the pillars and the gaps between the pillars have a smallest value at a center of the optical device and are gradually increased toward peripheries of the optical device.

* * * * *